United States Patent [19]

Hill

[11] Patent Number: 5,111,687
[45] Date of Patent: May 12, 1992

[54] ROADWHEEL FOR TIRE TESTING APPARATUS

[75] Inventor: Charles F. Hill, Canton, Ohio

[73] Assignee: Standards Testing Laboratories, Inc., Massillon, Ohio

[21] Appl. No.: 617,561

[22] Filed: Nov. 26, 1990

[51] Int. Cl.$^5$ .......................................... G01M 17/02
[52] U.S. Cl. .................................. 73/146; 29/894.371
[58] Field of Search ........ 73/146; 29/894.32, 894.321, 29/894.322, 894.323, 894.324

[56] References Cited

U.S. PATENT DOCUMENTS

| | | | |
|---|---|---|---|
| Re. 16,520 | 1/1927 | Kasper | 295/22 |
| 417,995 | 12/1889 | Dunstedter | 295/15 |
| 1,310,246 | 7/1919 | Moore | 29/894.321 |
| 2,397,719 | 4/1946 | Ash | 29/894.324 |
| 3,142,178 | 7/1964 | Gough et al. | 73/146 |
| 3,927,561 | 12/1975 | Schleimann | 73/146 |
| 4,856,324 | 8/1989 | Potts | 73/146 |

OTHER PUBLICATIONS

"Programmable Tire Testing Machine Offers Realism and Versatility" from SAE Journal, Sep. 1965.

*Primary Examiner*—Donald O. Woodiel
*Attorney, Agent, or Firm*—Michael Sand Co.

[57] ABSTRACT

This invention relates to tire testing apparatus and, more particularly, to an improved roadwheel for use with tire testing apparatus of various types which are capable of more accurately measuring the roadability and wear characteristics at high speeds of rotation. The roadwheel has angularly-inclined web plates connecting its hub and rim portions to provide greater stability and durability at greater stresses caused by increased centrifugal forces. The wheel also provides greater margins of safety in tire testing operations.

4 Claims, 2 Drawing Sheets

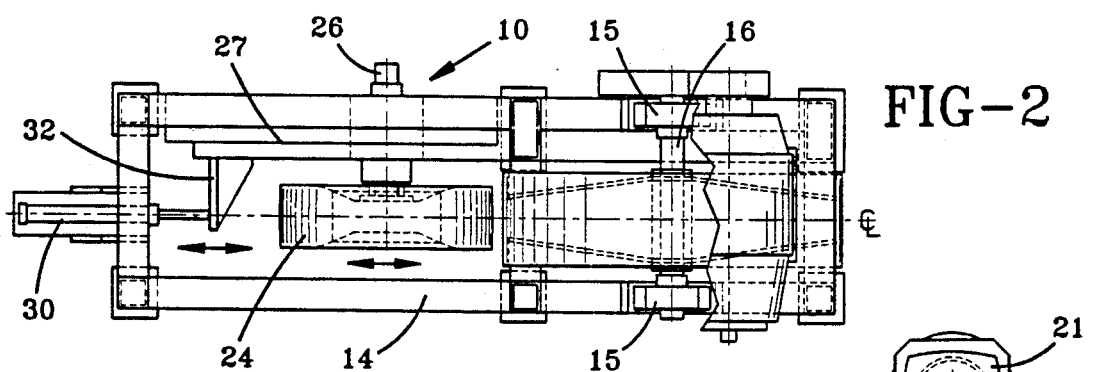
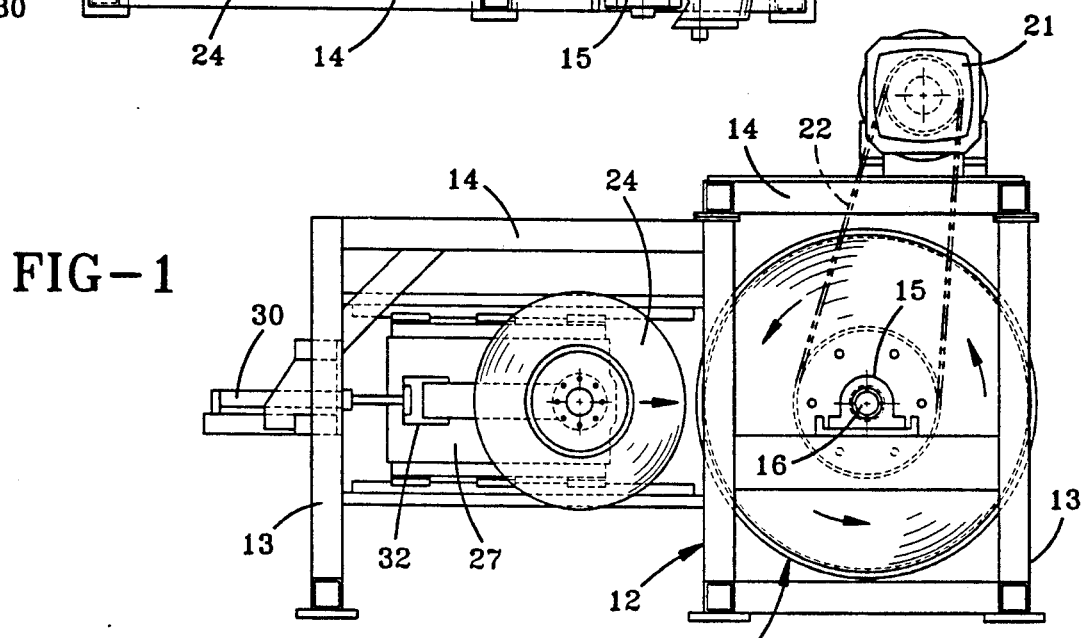
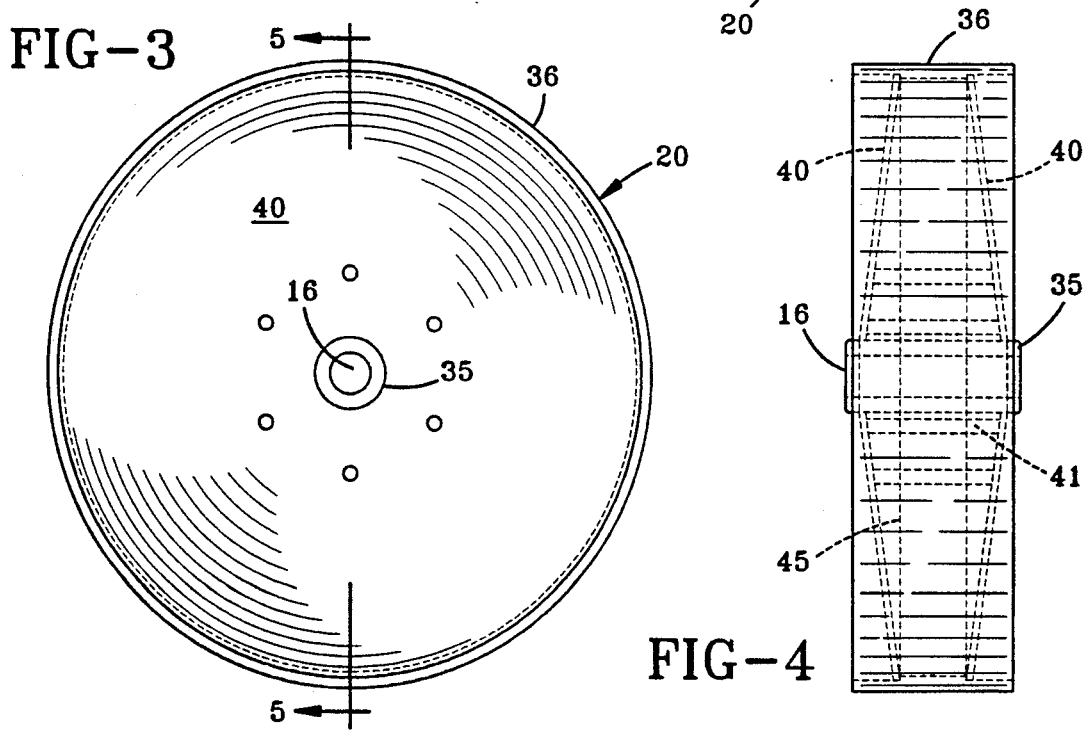

ROADWHEEL FOR TIRE TESTING APPARATUS

BACKGROUND OF THE INVENTION

1. Technical Field

This invention relates to apparatus for determining the rolling and wear-resistance of tires and, in particular, to the roadwheel structure which is utilized with such apparatus. Such tire testing apparatus is employed to test pneumatic tires at greater speeds of rotation, the improved roadwheel permitting much greater speeds of rotation with greater accuracy of measurements, and greater margins of safety in the roadwheel structure.

2. Background Information

In the manufacture of tires and, particularly pneumatic tires used for passenger vehicles, trucks, vans, trailers, and the like, the tires are subjected to tire-rolling resistance measurement tests to be certain that the same meet prescribed test standards. Such measurements normally are obtained by placing a freely-rotatable mounted tire in contact with a driven loadwheel or wheels which are commonly called a roadwheel. Various types of measurements are obtained employing load cells which calculate the amount of resistance to rolling movement of the tire. Prior art testing apparatus is increasingly sophisticated and the tires are subjected to increasingly greater rotational speeds, the roadwheels requiring more durable and safer constructions.

The prior art roadwheels have been essentially right-cylindrical in shape, having one or more radially-extending web members which are formed parallel to the plane of rotation of the wheel. An important factor effecting prior test results is the inherent friction which is naturally present in bearing mountings of both the test tire and the roadwheel or wheels. As the roadwheels are rotated at increasingly greater speeds, the centrifugal forces generated at the higher speeds create both greater centrifugal forces on the roadwheel and its elements of construction. When the roadwheels are subjected to speeds of the order of 1000 to 1500 revolutions per minute, for example, the load wheel must provide greater margins of safety against its self-destruction when placing various load levels on the wheel by tangential contact with the tires being tested.

Some examples of prior art tire testing machines and apparatus are disclosed in U.S. Pat. Nos. 3,498,125, 3,543,576, 3,948,095, 4,171,641, 4,233,838, 4,238,954 and 4,324,128. However, none of the known prior art tire testing machines and apparatus provide any significant improvements in the roadwheel element which is especially adapted to high speeds of rotation.

U.S. Pat. No. 4,829,815 discloses tire testing apparatus in which friction is effectively eliminated by rotating the outer race of the supporting bearings at approximately the same speed as the inner race, thereby eliminating relative motion between the bearing elements and accordingly eliminating bearing losses.

U.S. Pat. No. 4,856,324 discloses a high-speed tire testing device which compensates for the elastic deformation of the structural components that support the tire during the loading of the tire against the roadwheel.

Essentially, none of the prior art devices are directed to improvements in the roadwheel for higher test speeds of rotation which will both insure safety of the apparatus during test procedures, as well as to permit more sophisticated measurements of tires when tangentially driven by the roadwheel.

SUMMARY OF THE INVENTION

It is a major objective of the invention to provide an improved roadwheel for tire testing apparatus in which the tire to be tested is freely rotatably mounted on a spindle for moving a tire into engagement with a driven load wheel or wheels whereby various measurements can be taken to determine the rolling resistance of the outer tire surface and in which more accurate measurements can be obtained by eliminating the inherent rolling friction of the bearings which rotatably mount the test tire and the roadwheel or wheels.

Another objective of the invention is to provide such an improved roadwheel for tire testing apparatus which is significantly more stable in high-speed tire testing operations wherein rolling resistance of the tires and frictional forces of the test apparatus are conducted with greater accuracy when placing various loading factors on the tire under test.

A further objective of the invention is to provide an improved roadwheel for tire testing apparatus which is able to more durably withstand angular loading forces placed on the tire at higher speeds of rotation, the simulated road surface providing greater stability and durability for more efficient tire testing.

These objectives and advantages are obtained by the improved roadwheel member utilized with various types of tire testing apparatus, the general nature of which may be stated as including at least one rotatable roadwheel mounted on a spindle; tire holding means for rotatably mounting a tire and for moving said tire into engagement with the roadwheel; motor means for rotating the roadwheel spindle; bearing members having inner and outer races rotatably supporting the roadwheel spindle at each end of the spindle; the web forming elements of the roadwheel being angularly inclined to provide greater rotational stability against greater centrifugal forces encountered at higher speeds of rotation of the roadwheel during tire testing.

BRIEF DESCRIPTION OF THE DRAWINGS

Several preferred embodiments of the invention, illustrative of the best mode in which the applicant has contemplated applying the principles, are set forth in the following description and shown in the drawings and are particularly and distinctly pointed out and set forth in the appended claims.

FIG. 1 is a side elevational view of the high-speed tire testing apparatus incorporating the roadwheel of the present invention.

FIG. 2 is a top plan view of the tire testing apparatus shown in FIG. 1;

FIG. 3 is an enlarged side elevational view of the roadwheel device of the present invention;

FIG. 4 is an end view of the improved roadwheel shown in FIG. 3 showing its web plate elements in dotted outline;

Similar numerals refer to similar parts throughout the drawings.

DESCRIPTION OF THE PREFERRED EMBODIMENT

Figure 5:
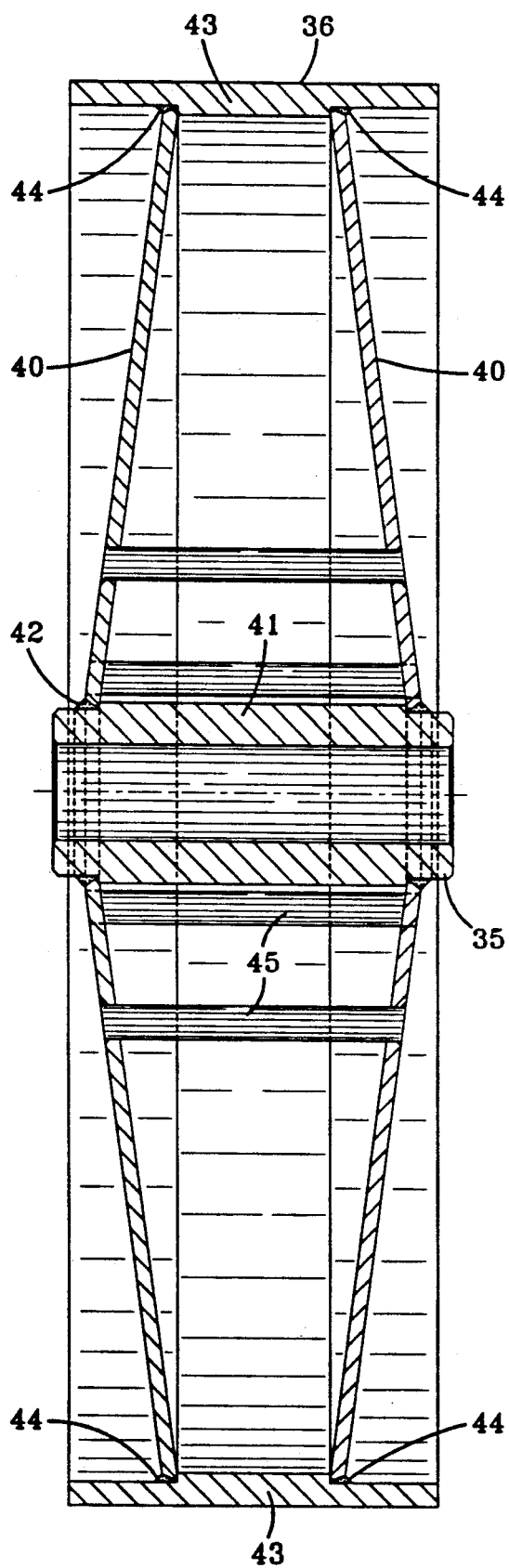
FIG. 5 is a further enlarged vertical sectional view taken along the line 5—5 of FIG. 3 of the subject roadwheel in a preferred embodiment.

A high-speed tire testing machine 10 constructed in accordance with the principles of the present invention is disclosed in FIGS. 1 and 2. A main support base 12 includes a plurality of vertical support beams 13 and horizontal beams 14, two of which have anti-friction bearings 15 mounted therein for rotatably supporting an axle 16 for a roadwheel 20. The roadwheel 20 is driven by an electric motor 21 which is operably connected to axle 16 by a high strength timing belt 22.

A test tire 24 is mounted to a rotatable spindle 26 supported on a slide mechanism 27 for selective tangential engagement with roadwheel 20. The particular structure for supporting the tire in freely-rotatable arrangement is not disclosed in any further detail, since such examples of the tire supporting housing and elements are clearly set forth in U.S. Pat. Nos. 4,856,324 and 4,829,815, both of which relate to high-speed tire testing devices.

Test tire 24 is forced against the roadwheel 20 in tangential arrangement engaged or disengaged from the roadwheel such as by a linear actuator 30 that is engaged with slide mechanism 27 at its piston end 32. The linear actuator is spaced substantially away from the longitudinal access of the housing generally, coincident with the horizontal access of roadwheel 20 to provide the necessary stability to the housing during its movement toward and away from roadwheel 20. Various maximum and minimum diameters of the test tire 24 can be mounted to the housing and drawn against or disengaged from roadwheel 20 by slide mechanism 27. Essentially, all of the aforesaid elements are conventionally known in the art and do not comprise a part of the subject invention.

The improved roadwheel 20 of this invention which is especially adapted for high-speed rotation has a hub portion 35 for supporting the wheel on the axle 16, the axle being supported at both ends on a frame. The electric motor 21 is mounted closely adjacent the wheel axle for driving the wheel from low to high speeds of rotation.

The improved roadwheel has a circular tapered outer rim portion 36 and hub portion 35 which are joined by a pair of similar annular web plates 40 preferably by welding. The web plates are mounted in angularly inclined array in a generally convex configuration as shown in FIGS. 4 and 5. As shown in FIGS. 4 and 5, the hub portion 35 has a tapered stepped configuration at its outer diameter which constitutes a rather shallow annular flange 41 to which the inner diameters of the web plates are rigidly attached such as by continuous welds 42. The outer rim portion 36 has an annular flange 43 on its interior surface to which the outer peripheries of the several weld plates 40 are attached such as by continuous welds 44. The hub portion 35 and outer rim portion 36 of the subject roadwheel 20 are generally complemental in width, the web portions 40 being joined in non-right-cylindrical angular configuration. As shown in FIGS. 4 and 5, the plates 40 have a generally convex configuration in a preferred embodiment. Intermediate areas of the angularly-inclined pair of web plates 40 are joined by a radial series of reinforcing members or bars 45 which are fitted into drilled holes in the plates. The bars 45 are preferably mounted transversely to the plane of rotation of the wheel and welded in place in equi-spaced arrangement. As shown in FIGS. 3, 4, and 5, a series of six reinforcing bars 45 are welded securely in place spaced closer to the hub portion 35 than the rim portion 36. A greater number of bars 45 may be employed in a roadwheel having a greater diameter than about 7 feet which is the most common diameter of a conventional test roadwheel. The web plates 40 have an essentially uniform thickness with both plates being joined at their inner and outer diameters by continuous welds. The welds adjoining the outer rim portion to the web plates comprise generally lengthy filleted structures which are at least as thick or thicker than the web plates per se.

The plurality of reinforcing bars 45 are arranged in radial array to join intermediate juxtaposed portions of the web plates such as by welding. The reinforcing members may comprise reinforcing bars having a circular cross-section which are arranged in equi-spaced arrangement around an intermediate area of the web plates. Such reinforcing members prevent any flexure of the web plates at high speeds of rotation, especially when tire loading is applied angularly. The web plates are preferably solid and comprised of high-strength carbon steel for maximum wheel strength and to prevent any distortion or vibration thereof, especially at its rim portion when rotated at extremely high speeds.

Figure 6:
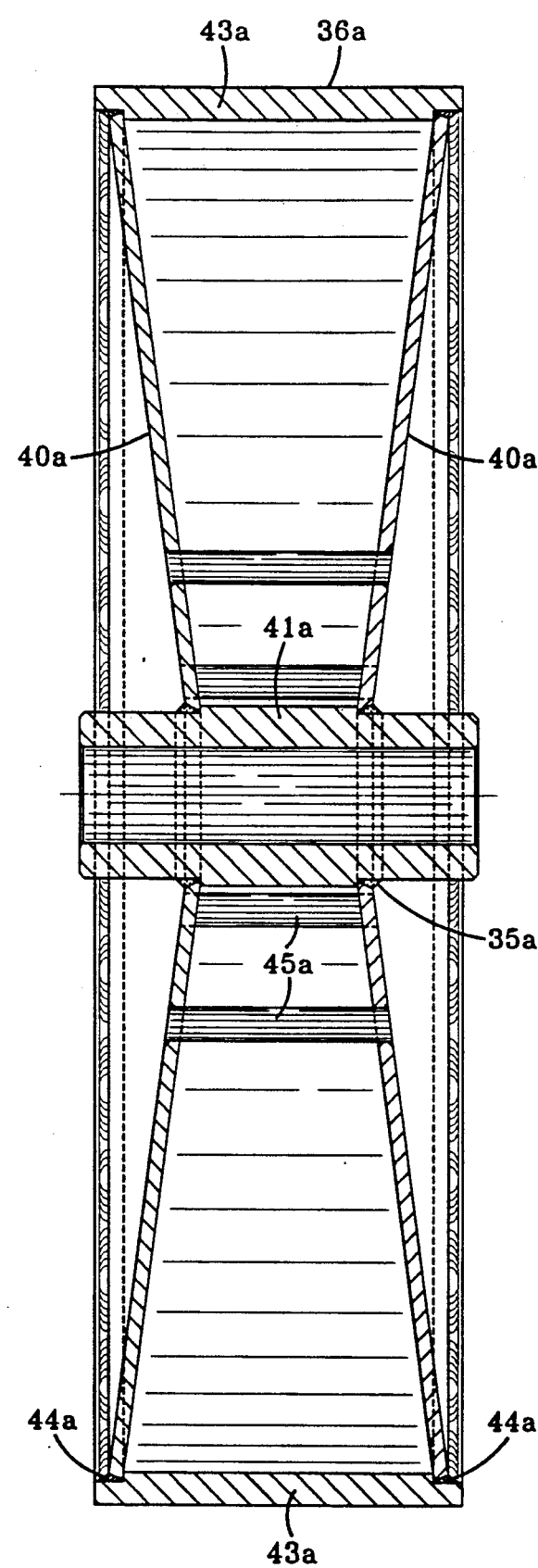
FIG. 6 is a view similar to FIG. 5 of a second embodiment of the subject roadwheel of the present invention.

A second embodiment of the invention wherein the web plates 40a have a concave arrangement is shown in FIG. 6. The hub portion 35a has a stepped flange portion 41a which has a substantially lesser length than the flange of the first embodiment. The web plates 40a are inclined outwardly having their inner diameters welded to the stepped flange 41a of the hub. The rim portion 36a has a stepped flange 43a on its inner surface which has a substantially greater length than the flange 43a of the first embodiment. The outer edges of the pair of web plates 40a are welded at the rim portion 36a near its outer edges. The same type and shape of web plates may be utilized as in the first embodiment, only being mounted between hub and rim in reversed relation. The reinforcing bars 45a are utilized in a similar manner to connect the web plats 40a in a radial series, the bars mounted transversely to the plane of rotation.

The subject roadwheel is especially adapted for use with a newly-developed tire testing machine which can apply programmed dynamic loads to a wide range of tire sizes at realistic rates of driving including racing. In combination with the subject roadwheel, forced components and torqued responses can be measured and recorded with improved accuracy. Tire behavior under steady-state conditions can be simulated and determined with such advanced apparatus. Such new apparatuses which are called dynamic characteristic machines are fully capable of generating vehicle motion along a simulated road surface at speeds ranging from nearly dead-slow to 300 miles per hour. The tire can be positioned rapidly and accurately so that it can be made to steer, bounce, camber and scrub the road surface in simulation of actual driving conditions. The tests are capable of measuring various components of force applied to the tire and the torque responses of the car tire as they occur over time in reaction to the variously applied force components and motions.

The hydraulic loading cylinder of the apparatus applies pressure against the wheel-loading arm. This arm moves the tire supporting assembly against the roadwheel and slides on guide rods for maintaining vertical and horizontal alignment. The rods are contained within the housing carriage which also supports the ball-joint tire spindle.

The preferred structure of the roadwheel is a seven foot diameter open shell welded structure with a machine finished road surface about 20 inches in width. The circumferential curvature of the road surface is considered small enough to have an essentially negligible effect on tire behavior during test experimentation. The roadwheel is preferably driven at 1750 R.P.M. by a 300 horsepower electric motor coupled to the loadwheel by belt 22. A feedback control system maintains road speeds constant within plus or minus ¼ m.p.h. throughout the 0 to 150 M.P.H. range at 5000 R.P.M. and the 150 to 300 M.P.H. range at 3500 R.P.M. A remote blower supplies cooling air to the drive motor which eliminates extraneous noise during tire noise and squeal evaluation tests. The details of such tire testing machine which utilizes electronics to program events simulating a wide range of operating conditions is further disclosed in the article entitled "Programmable Tire Testing Machine Offers Realism and Versatility" by S. A. Lippmann published in the S.A.E. Journal, Sept. 1965. The types of steady-state conditions which can be studied with much greater accuracy are set forth in the referenced article, the subject roadwheel being particularly useful for incorporation into such machines.

Finite element analyses of the two alternative embodiments for the structure of the subject roadwheel have been conducted including stress determinations for 1500 revolutions per minute (300 m.p.h.) centrifugal loading as well symmetric and anti-symmetric natural vibration frequency and mode shaped determinations. The configurations shown in FIGS. 5 and 6 have been utilized for these analyses, the basic difference between the two designs and the prior art designs using right-cylindrical web plates is the degree of inclination provided for the web plates connecting the rib and hub of the roadwheel. The two designs themselves, basically differ only in the depth to which the hub and rim are machined in order to receive the inclined web plates.

The results of these analyses may be briefly summarized as follows;

A. For the decreased degree of inclination of the web plates, the first anti-symmetric mode of vibration has a natural frequency of about 52.5 Hertz cycles (Hz) which is above the target value of 50 Hz for such determinations.

B. The first symmetric mode of vibration has a natural frequency of about 246 Hz even without any connectors or reinforcing elements tying the two web plates to each other.

C. A simulated "crack" created by an assumed weld detail between the hub and web plate tends to "close" under centrifugal loading and, thus, was assumed to be bonded for purposes of analysis. Such phenomenon is beneficial with regard to crack growth potential for this connection weld detail in that tensile stresses which are required for crack growth were limited in magnitude.

D. Tensile stresses normal to the "crack" created by the rim and web connection weld detail, which tends to open under centrifugal loading, were computed to be under ten kips per square inch at a rotational speed of 1500 revolutions per minute even in the immediate vicinity or within about 1/16 inch of the theoretical crack tip.

E. Localized hoop stresses somewhat over about 20 ksi and in plane stresses somewhat over 30 ksi were computed on the outer web/hub connection region. These stresses are primarily a result of the flexing of the inclined web plate which occurs under centrifugal loading. These locally high stresses are far away from the weld detail discontinuity or crack on the inner edge of this connection and are in an area readily accessible for regular inspection.

F. The two alternative designs as shown in FIGS. 5 and 6 which were examined by stress analyses appear to produce nearly identical results with little evidence that one is significantly better than the other. Both of these alternatives are superior to the previous design with the web/hub connection at the outer extremity of the hub. A small amount of stiffness is sacrificed in the long-axle direction with the accompanying decrease in natural frequency in that vibration mode but the stress intensities under centrifugal loading are decreased from previous right-cylindrical designs.

Accordingly, the improved roadwheel is simplified, provides an effective, safe, inexpensive, and efficient device which achieve all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved roadwheel is constructed and used, the characteristics of the construction, and the advantageous, new and useful results obtained; the new and useful structures, devices, elements, arrangements, parts and combination, are set forth in the appended claims.

I claim:

1. An improved roadwheel for testing tires at high speed comprising a rotatable wheel having a circular outer rim portion, said rim portion being formed with a spaced pair of annular stepped portions; a hub portion for supporting said wheel on a frame, said hub portion being formed with a spaced pair of annular stepped portions; means for driving said wheel from low to high speeds of rotation, said wheel having a pair of similar annular web plate members joining said hub portion to said outer rim portion, said web plates being joined to the hub and outer rim portions at the annular stepped portions thereof, in a symmetrical uniform convex arrangement by welds; a plurality of reinforcing members extending between and interconnecting the web plates; and the outer rim portion having tapered thickness outer ends extending beyond the web plates.

2. An improved roadwheel in accordance with claim 1, wherein the reinforcing members are parallel bars joining juxtaposed intermediate areas of said web plates.

3. An improved roadwheel in accordance with claim 1, wherein said hub portion and said outer rim portion have generally complemental width dimensions.

4. An improved roadwheel in accordance with claim 1, wherein said web plates are joined to said hub and outer rim portions by continuous welds in non-right-cylindrical array.

* * * * *